US00RE41311E

(19) United States
(12) Reissued Patent
Denkmann et al.

(10) Patent Number: US RE41,311 E
(45) Date of Reissued Patent: May 4, 2010

(54) HIGH FREQUENCY ELECTRICAL CONNECTOR

(75) Inventors: W. John Denkmann, Carmel, IN (US); Willard A. Dix, Noblesville, IN (US); William T. Spitz, Indianapolis, IN (US)

(73) Assignee: CommScope, Inc. of North America, Hickory, NC (US)

(21) Appl. No.: 10/994,928

(22) Filed: Nov. 22, 2004

Related U.S. Patent Documents

Reissue of:
(64) Patent No.: 5,186,647
Issued: Feb. 16, 1993
Appl. No.: 07/840,476
Filed: Feb. 24, 1992

(51) Int. Cl.
*H01R 4/24* (2006.01)

(52) U.S. Cl. ..... 439/395; 439/676; 439/941; 439/108

(58) Field of Classification Search ..... 439/389–425, 439/676, 941, 108
See application file for complete search history.

(56) References Cited

U.S. PATENT DOCUMENTS

| | | | |
|---|---|---|---|
| 3,305,846 | A | 2/1967 | Amemiya |
| 3,611,264 | A | 10/1971 | Ellis, Jr. |
| 3,737,833 | A | 6/1973 | Jerominek |

(Continued)

FOREIGN PATENT DOCUMENTS

| | | | |
|---|---|---|---|
| AU | 34876/89 | | 12/1989 |
| DE | 2004 346 | | 8/1971 |
| EP | 0 000 434 | A1 | 1/1979 |
| EP | 0 000 434 | B1 | 5/1983 |
| EP | 0 080 772 | A1 | 6/1983 |
| EP | 0 232521 | A3 | 8/1987 |
| EP | 0 345 988 | A2 | 12/1989 |
| EP | 0 232 521 | B1 | 10/1992 |
| GB | 1 432 793 | | 4/1976 |
| GB | 1 440 392 | | 6/1976 |
| GB | 2 013 423 | A | 8/1979 |
| GB | 2 146 495 | A | 4/1985 |
| GB | 2 167 912 | A | 6/1986 |
| GB | 2 233 157 | A | 1/1991 |
| GB | 2 242 080 | A | 8/1991 |
| GB | 0525703 | | 2/1993 |
| JP | 61-194971 | U | 12/1986 |
| JP | 64-20690 | U | 2/1989 |
| JP | 2-27673 | A | 1/1990 |
| JP | 3-196477 | A | 8/1991 |

OTHER PUBLICATIONS

American Telephone and Telegraph Company, *Principles of Electricity Applied to Telephone and Telegraph Work*, Jun. 1961, pp. 334–344.

(Continued)

*Primary Examiner*—Gary F. Paumen
(74) *Attorney, Agent, or Firm*—Myers Bigel Sibley & Sajovec, P.A.

(57) ABSTRACT

An electrical connector for conducting high frequency signals includes a number of input and output terminals that are interconnected by a pair of metallic lead frames that are mounted on a dielectric spring block. The lead frames are identical to each other and comprise several flat elongated conductors, each conductor terminating in a spring contact at one end and an insulation-displacing connector at the other. The lead frames are mounted on top of each other and their conductors are all generally parallel and close to each other. Only three of the conductors of each lead frame are arranged to overlap each other; and this occurs in a designated crossover region without electrical contact being made because of a reentrant bend in the conductors in the crossover region. As a result, crosstalk between specific conductors can be reduced by judiciously choosing the location of the crossover and the particular crossover pattern.

14 Claims, 5 Drawing Sheets

U.S. PATENT DOCUMENTS

| | | | | | |
|---|---|---|---|---|---|
| 3,757,028 | A | | 9/1973 | Schlessel | |
| 3,761,812 | A | | 9/1973 | Plake | |
| 3,761,842 | A | | 9/1973 | Gandrud | |
| 3,798,587 | A | | 3/1974 | Ellis, Jr. et al. | |
| 4,072,390 | A | | 2/1978 | Fox | |
| 4,171,857 | A | | 10/1979 | Forberg et al. | |
| 4,232,929 | A | | 11/1980 | Zobawa | |
| 4,261,633 | A | | 4/1981 | Abernethy | |
| 4,367,908 | A | * | 1/1983 | Johnston | 439/676 |
| 4,413,469 | A | * | 11/1983 | Paquin | 57/293 |
| 4,418,239 | A | | 11/1983 | Larson et al. | |
| 4,676,576 | A | | 6/1987 | Feldberg et al. | |
| 4,725,249 | A | | 2/1988 | Blackwood et al. | |
| 4,767,338 | A | | 8/1988 | Dennis et al. | |
| 4,785,135 | A | | 11/1988 | Ecker et al. | |
| 4,820,192 | A | | 4/1989 | Denkmann et al. | |
| 4,831,497 | A | * | 5/1989 | Webster et al. | 361/406 |
| 4,850,887 | A | * | 7/1989 | Sugawara | 439/108 |
| 4,865,564 | A | | 9/1989 | Denkmann et al. | |
| 4,871,330 | A | | 10/1989 | Muller et al. | |
| 5,055,064 | A | | 10/1991 | Imaizumi et al. | |
| 5,074,804 | A | | 12/1991 | Pantland et al. | |
| 5,299,956 | A | | 4/1994 | Brownell et al. | |
| 5,326,284 | A | | 7/1994 | Bohbot et al. | |
| 5,432,484 | A | | 7/1995 | Klas et al. | |
| 5,496,196 | A | | 3/1996 | Schachtebeck | |
| 5,525,078 | A | | 6/1996 | Springer | |
| 5,580,270 | A | | 12/1996 | Pantland et al. | |

OTHER PUBLICATIONS

*An American National Standard–IEEE Standards for Local Area Netowrks: Token Ring Access Method and Physical Layer Specification*, ANS/IIEEE Std 802.5–1985.

AT&T Network Systems, 1061C and 2061B Cables, 1994, 4 pp.

AT&T Network Systems, *M100BH and M100BH Modular IDC Termination Communication and Information Outlets*, 1993, 3 pp.

AT&T Network Systems, *SYSTIMAX® Structured Cabling Systems for a Premises Distribution System*, 1993,2 pp.

Catalog, MOD–TAP Components, Oct. 1990.

Certified Copy of File History for AU Patent No. 651028 prepared Sep. 24, 2004.

Certified Electronic copy of Prosecution and Opposition File History for EU Patent Application No. 93301116.5.

Cohen et al., *A Handbook of Telecommunications*, Sir Isaac Pitman & Sons, Ltd., London, 1946, pp. 294–303.

*Course of Technical Instructions*, Publication of the Postmaster–General's Department, Australia, Engineering Branch, 1951, pp. 1–16.

*Electrical Communications Systems engineering: Transmission and Circuit Layout*, Technical Manual No. 11–486–3, Ref. C1, Department of the Army, Washington 25, D.C., Dec. 26, 1956.

Electronics Industries Association, EIA/TIA Standard: *Commercial Building Telecommunications Wiring Standard*, EIA/TIA–568, Jul. 1991.

Everitt, *Communication Engineering, Second Edition*, McGraw–Hill Book Company, Inc., New York and London, 1937, pp. 330–335.

File history for JP Patent Application No. 5–47177, including English language translation.

Gerhardi et al., *The Psion Organiser Communications Handbook*, Kuma Computers Ltd., 1990, pp. 14–19.

Herbert et al., *Telephony: A Detail Exposition of the Telephone System of the British Post Office, Second Edition*, vol. I, Sir Isaac Pitman & Sons, Ltd., 1946, pp. 820–827.

Krone, *Krone–Highband Training Notes*.

Post Master General'Department, Commonwealth of Australia, *The Lineman's Handbook*, 1966, pp. 1–1–1–17.

Power and Digital Instruments Pty LTD, *PDI laboratory Test Report No. 9538: RS 232 Shielded Jumper Box Archer* 267–1403, Apr. 6, 1995.

Power and Digital Instruments Pty LTD, *PDI Laboratory Test report No. 9642: Category 5 Connecting Hardward, Davies Collison* Cave, Part No. AT&T M100 B/C, RJ45 Jack, Feb. 23, 1996.

Schubert, *Communications Cables and Transmission Systems, Third Revised Edition*, Siemens Aktiengesellschaft, 1976, pp. 135–146.

Tandy Electronics 1990/91 Catalogue.

*Technical Training Pack, Principals of Cable and Plant*, National Extension College, UK, ISBN 0–86082–517–5, pp. 7–10.

*Transmission and the Truck Network*, The Post office Electrical Engineers' Journal, vol. 49, Part 3, Oct. 1956, pp. 216–217, 246.

United States of America Standard on eight wire connectors, Figures 68.500(d)(1), 68.500(d)(2) and 68.500(d)(3), Federal Register vol. 41, No. 134 Monday, Jul. 12, 1976.

Way, *communications, Wire and Wireless, Wells*, Gardner, Darton & Co., London, 1937, pp. 104–105.

* cited by examiner

HIGH FREQUENCY ELECTRICAL CONNECTOR

Matter enclosed in heavy brackets [ ] appears in the original patent but forms no part of this reissue specification; matter printed in italics indicates the additions made by reissue.

TECHNICAL FIELD

This invention relates to an electrical connector, and more particularly to an electrical connector having reduced crosstalk between wire-pairs.

BACKGROUND OF THE INVENTION

Information flow has increased substantially in recent years, and networks have evolved to accommodate not only a greater number of users but also higher data rates. An example of a relatively high speed network is the subject of ANSI/IEEE Standard 802.5 which provides a description of the peer-to-peer protocol procedures that are defined for the transfer of information and control between any pair of Data Link Layer service access points on a 4 Mbit/s Local Area Network with token ring access. At such data rates, however, wiring paths themselves become antennae that both broadcast and receive electromagnetic radiation. This is a problem that is aggravated when station hardware requires multiple wire-pairs. Signal coupling (crosstalk) between different pairs of wires is a source of interference that degrades the ability to process incoming signals. This is manifested quantitatively as decreased signal-to-noise ratio and, ultimately, as increased error rate. Accordingly, crosstalk becomes an increasingly significant concern in electrical equipment design as the frequency of interfering signals is increased.

Crosstalk occurs not only in the cables that carry the data signals over long distances, but also in the connectors that are used to connect station hardware to the cables. ANSI/IEEE Standard 802.5 discloses a Medium Interface Connector having acceptable crosstalk rejection at the frequencies of interest. This Connector features four signal contacts with a ground contact, and is hermaphroditic in design so that two identical units will mate when oriented 180 degrees with respect to each other. This Connector is available as IBM Part No. 8310574 or as Anixter Part No. 075849. Crosstalk rejection appears to result from short connector paths, ground shields, and the selection of particular terminals for each wire-pair. As might be expected, such connector arrangements are relatively expensive and represent a departure from communication plugs and jacks such as specified in Subpart F of the FCC Part 68.500 Registration Rules and used in telecommunication applications.

For reasons of economy, convenience and standardization, it is desirable to extend the utility of the above-mentioned telecommunication plugs and jacks by using them at higher and higher data rates. Unfortunately, such plugs and jacks include up to eight wires that are close together and parallel—a condition that leads to excessive crosstalk, even over relatively short distances. Attempts to improve this condition are complicated by the fact that an assignment of particular wire-pairs to particular terminals already exists which is both standard and non-optimum. Indeed, in ANSI/EIA/TIA-568 standard, the terminal assignment for wire-pair 1 is straddled by the terminal assignment for wire-pair 2 or 3. If the electrical conductors that interconnect with these terminals are close together for any distance, as is the case in present designs, then crosstalk between these wire-pairs is particularly troublesome. Accordingly, it is desirable to reduce crosstalk in electrical connectors such as the plugs and jacks commonly used in telecommunication equipment.

SUMMARY OF THE INVENTION

In accordance with the invention, an electrical connector for connecting an ordered array of input terminals to an ordered array of output terminals is improved. The connector includes at least four conductors that are spaced apart from each other and make electrical interconnection between the input and output terminals. The conductors are generally parallel to each other along a portion of the interconnection path and are arranged to change the relative ordering of terminals, between input and output, from the ordering that would result if all conductors were confined to the same plane.

In an illustrative embodiment of the invention, the input terminals of the electrical connector comprise insulation-displacing connectors, each having a pair of opposing contact fingers which functions to make electrical and mechanical connection to an insulated wire inserted therein. Further, the output terminals of the electrical connector comprise wire springs. Two lead frames, each comprising an array of conductors, are mounted on a dielectric block. Each conductor terminates, at one end, in a wire spring and, at the other end, in an insulation-displacing connector. Selected conductors of the lead frames cross over each other when they are mounted on the dielectric spring block, but are prevented from making electrical contact with each other at the point of crossover—one of the conductors includes an upward reentrant bend and the other includes a downward reentrant bend. Advantageously, the two lead frames are identical, but are reverse-mounted on the spring block in the left-to-right direction. The front side of the spring block includes a projection which fits into one end of a jack frame and interlocks therewith. Together, the spring block and jack frame comprise a standard modular jack of the type specified in the FCC Registration Rules.

BRIEF DESCRIPTION OF THE DRAWING

The invention and its mode of operation will be more clearly understood from the following detailed description when read with the appended drawing in which.

DETAILED DESCRIPTION

Most communication systems transmit and receive electrical signals over wire-pairs rather than individual wires. Indeed, an electrical voltage is meaningless without a reference voltage—a person can't even get shocked unless part of his body is in contact with a reference voltage. Accordingly, the use of a pair of wires for electrical signal transmission is merely the practice of bringing along the reference voltage rather than relying on a local, fixed reference such as earth ground. Each wire in a wire-pair is capable of picking up electrical noise from noise sources such as lightning, radio and TV stations. However, noise pickup is more likely from nearby wires that run in the same general direction for long distances. This is known as crosstalk. Nevertheless, so long as each wire picks up the same noise, the voltage difference between the wires remains the same and the differential signal is unaffected. To assist each wire in picking up the same noise, the practice of twisting wire-pairs in various patterns emerged.

Figure 1:
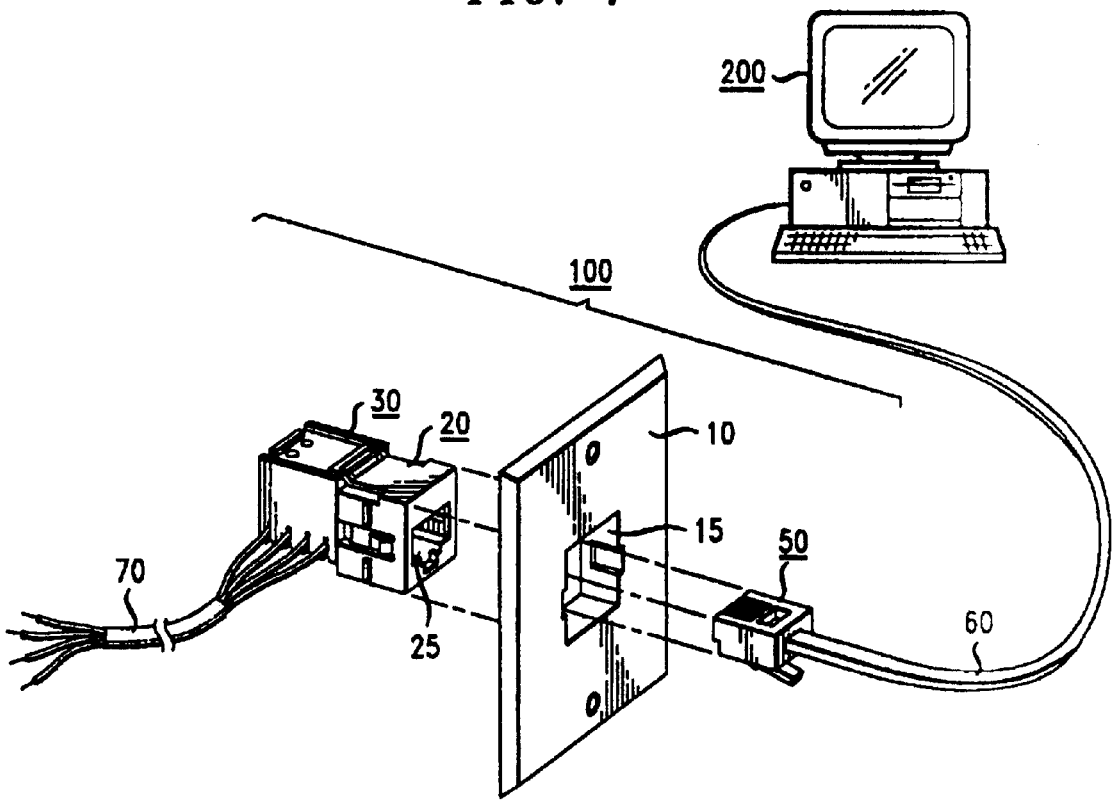
FIG. 1 discloses the use of a modular connector to interconnect high speed station hardware with a communication cable.

FIG. 1 discloses an interconnection between high speed station hardware 200 and cable 70 which comprises a number of wire-pairs. Electrical interconnection between the station hardware 200 and cable 70 is facilitated by the use of standard telecommunications connectors that are frequently referred to as modular plugs and jacks. Specifications for such plugs and jacks can be found in Subpart F of the FCC Part 68.500 Registration Rules. Assembly 100 is adapted to accommodate the use of modular plugs and jacks and comprises connector 30, jack frame 20 and wall plate 10 which interlock together to provide a convenient receptacle for receiving modular plug 50. Inserted into opening 25, on the front side of jack frame 20, is the modular plug 50 which communicates electrical signals, via cable 60, to and from station hardware 200. Inserted into the back side of jack frame 20 is electrical connector 30 which is constructed in accordance with the principles of the invention. Wires from cable 70 are pressed into slots located on opposite side walls of connector 30 and make mechanical and electrical connection thereto. Four identical slots (not shown) are symmetrically positioned on the opposite side of connector 30. Wall plate 10 includes an opening 15 that receives and interlocks with jack frame 20.

Figure 2:
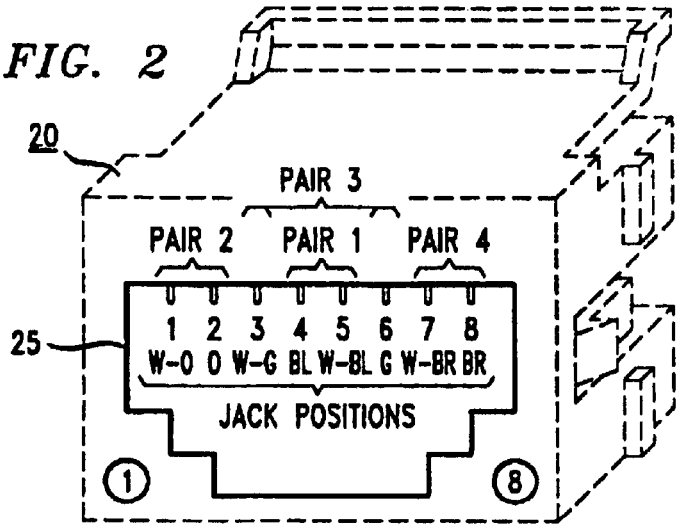
FIG. 2 shows the jack contact wiring assignments for an 8-position, telecommunications outlet (T568B) as viewed from the front opening.

Terminal wiring assignments for modular plugs 50 and jacks 20 are specified in ANSI/EIA/TIA-568-1991 which is the Commercial Building Telecommunications Wiring Standard. This Standard associates individual wire-pairs with specific terminals for an 8-position, telecommunications outlet (T568B) in the manner shown by FIG. 2. The Standard even prescribes the color of each wire and Near End Crosstalk performance in the frequency range 1–16 MHz. While the color assignment does not lead to difficulties, the pair assignment does—particularly when high frequency signals are present on the wire-pairs. Consider, for example, the fact that wire-pair 3 straddles wire-pair 1, as illustrated in FIG. 2, looking into opening 25 of the jack frame 20. If the jack frame and connector 30 (see FIG. 1) include electrical paths that are parallel to each other and are in the same approximate plane, there will be electrical crosstalk between pairs 1 and 3. As it turns out, many electrical connectors that receive modular plugs are configured that way, and although the amount of crosstalk between pairs 1 and 3 is insignificant in the audio frequency band, it is unacceptably high at frequencies above 1 MHz. Still, it is desirable to use modular plugs and jacks of this type at these higher frequencies because of connection convenience and cost.

Figure 3:
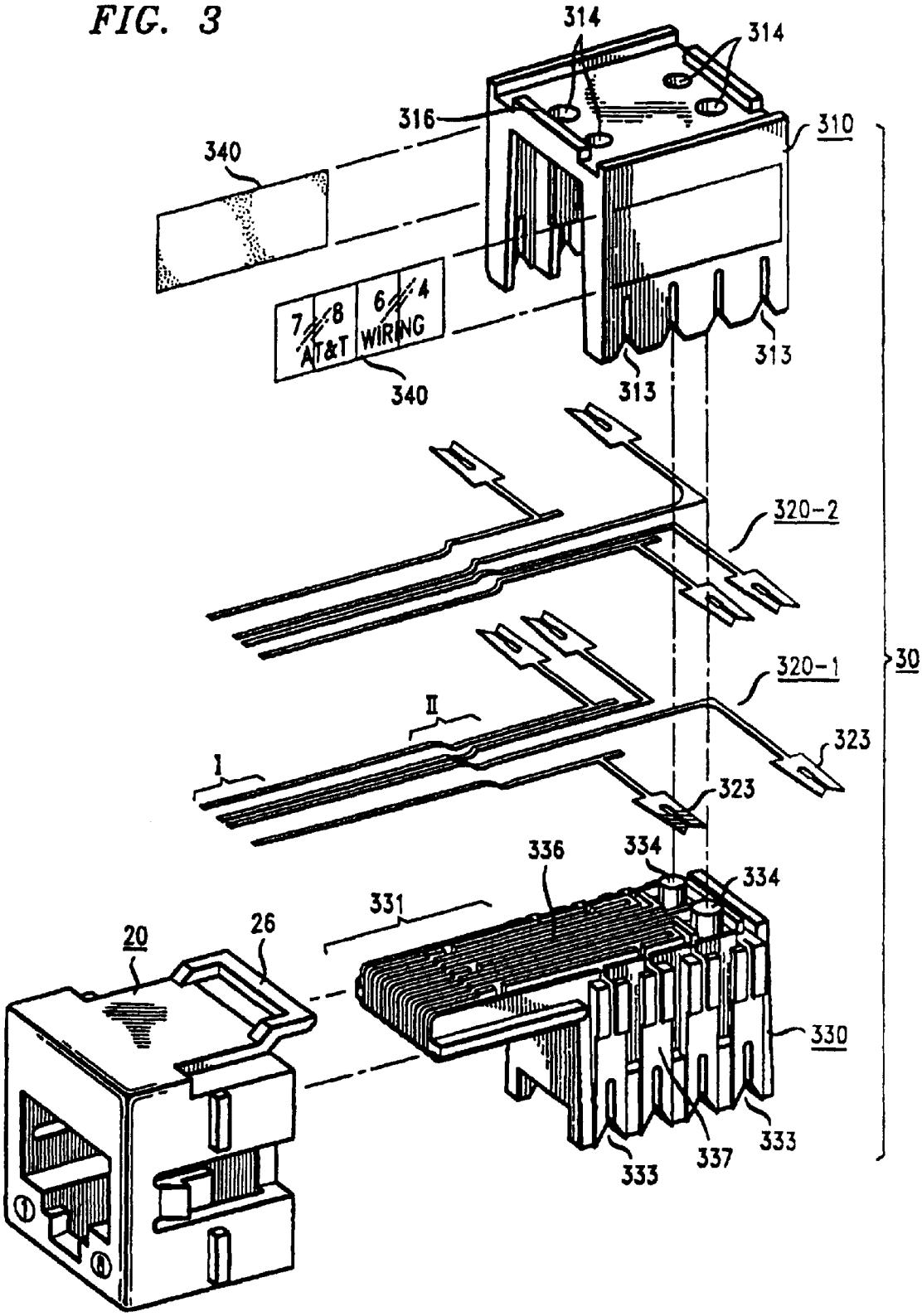
FIG. 3 is an exploded perspective view of a high frequency electrical connector in accordance with the present invention.
Figure 4:
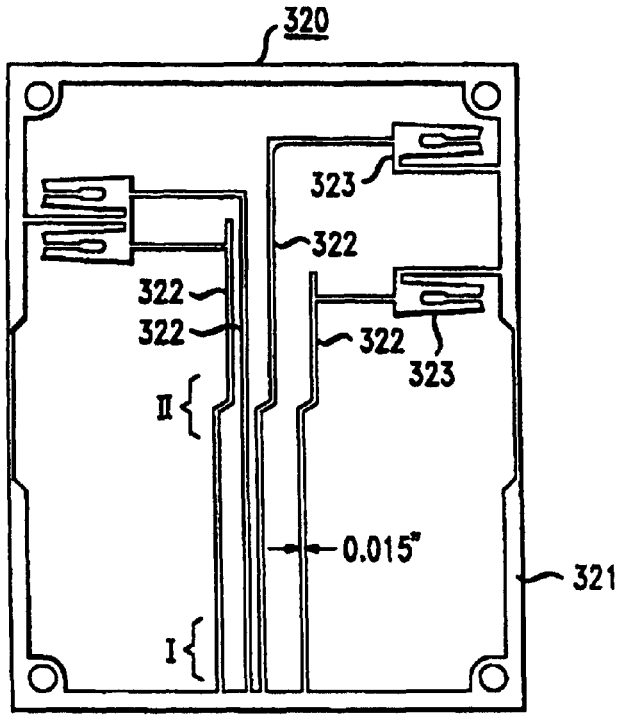
FIG. 4 discloses a top view of the lead frame used in the present invention and its associated carrier.

FIG. 3 discloses an exploded perspective view of high frequency electrical connector 30 and jack frame 20 showing their assembly in greater detail. Electrical connector 30 comprises spring block 330, metallic lead frames 320-1, 320-2, cover 310, and labels 340 joined together as indicated. Referring briefly to FIG. 4. Lead frame 320 comprises four flat, elongated conductive elements 322 that terminate, at one end, in insulation-displacing connectors 323. Peripheral support structure 321 holds the conductive elements in a fixed relationship with respect to each other so that the lead frame can be easily handled; however, it is removed during assembly. Lead frame 320 is shaped into a desired electrical interconnection pattern which is, illustratively, stamped from 0.015 inch metal stock and gold plated in region I. During assembly, region I is bent around spring block 330 (see FIG. 3) to become the spring contacts within a modular jack. Because a portion of the lead frame is used as a spring contact, the entire lead frame itself is made from a resilient metal such as beryllium-copper although a variety of metal alloys can be used with similar results. Conductive elements 322 are parallel to each other and reside in the same plane. In order to reduce crosstalk between conductive elements, a technique is disclosed in which certain of the conductive elements are made to cross over each other in region II. Such crossover is not apparent in FIG. 4, but can be clearly seen in FIG. 3 where two identical lead frames 320-1, 320-2 are installed on top of each other, but reversed from left-to-right. Each of these lead frames is identical to the one shown in FIG. 4. Although a number of techniques can be used to electrically isolate the lead frames from each other, particularly in the region of the crossover, the preferred embodiment achieves electrical isolation by introducing a re-entrant bend in region II of the lead frame. This is most clearly seen in the side view of lead frame 220 shown in FIG. 5. Thus, when a pair of lead frames 320 are reversed from left-to-right and laid on top of each other, the conductive elements 322 bulge away from each other in region II. Another wy to achieve electrical isolations is to insert a dielectric spacer, such as mylar, between the lead frames. Although this technique avoids the need for a reentrant bend in the lead frame, an additional part is required.

Figure 10:
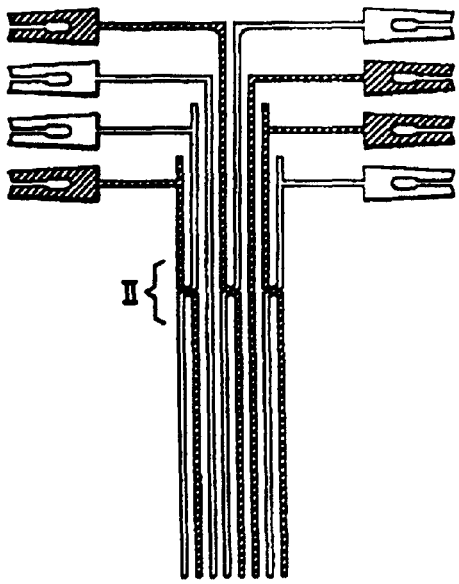
FIG. 10 is a top view of the lead frames shown in FIG. 3, after assembly, illustrating the crossover of certain conductors in region II.

FIG. 10 discloses a top view of a pair of lead frames after assembly in accordance with the invention, illustrating the crossover of certain conductors in region II. FIG. 10 is intended to clarify the way in which the conductors 322 of lead frames 320-1 and 320-2 (see FIG. 3) cross over each other. The top lead frame (designated 320-2 in FIG. 3) is shown with shading in FIG. 10, and the bottom lead frame (designated 320-1 in FIG. 3) is shown without shading in FIG. 10. Note that there is no electrical connection between any of the conductors, particularly in region II where the crossover occurs; note also that the top and bottom lead frames are identical to each other, but reversed from left to right.

Figure 5:
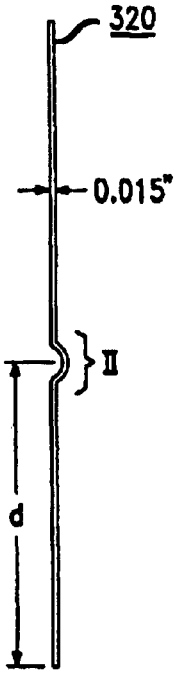
FIG. 5 discloses a side view of the lead frame and carrier of FIG. 4.

The positioning of region II where the crossover occurs has been empirically determined. Distance "d," indicated in FIG. 5, is located at the approximate mid-point of the signal path between the locations where electrical connections are made at the ends of the conductive paths. Since each conductive path has a different length, different crossover points are required for optimum results. Nevertheless, substantial crosstalk reduction is achieved in easy-to-manufacture lead frame 320 where the entire lead frame is creased along a single line.

Referring again to FIG. 3, lead frames 320-1, 320-2 are positioned on the top surface 336 of spring block 330 which includes grooves having the same pattern as the lead frame itself. Heat is, then, selectively applied to the grooves, via ultrasonic welding, in order to deform the thermoplastic material from which the spring block is made to permanently join the lead frames and spring block together. Insulation-displacing connectors 323 are folded down the sides of the spring block while the conductors in region I of lead frames 320-1, 320-2 are wrapped around tongue-like protrusion 331 of the spring block 330. Thereafter, cover 310 is joined to the spring block to create a unitary structure. In the present embodiment, spring block 330 cover 310 and jack frame 20 are all made from a thermoplastic material such as Polyvinyl Chloride (PVC).

After the insulation-displacing connectors 323 of the lead frame are folded around each side wall 337 on opposite sides of the spring block, the spaces between the opposing contact fingers that form the insulation-displacing connectors are aligned with wire-receiving slots 333 of the spring block so that a wire may pass therebetween. Side walls 337 are substantially parallel to each other and perpendicular to the top surface 336 of the spring block. Furthermore, when cover 310 is joined with spring block 330, its slots 313 are aligned with the spaces between opposing contact fingers of the insulation-displacing connectors 323. As a result, the insulation-displacing connectors are sandwiched between the spring block and cover, and protected from the possibility of an inadvertent electrical short between adjacent connectors. After the cover is joined to the spring block, pins 334 in the spring block protrude through two of the holes 314 in the cover. These pins are heated and deformed, via ultrasonic welding, to permanently join t he cover to the spring block. Cover 310 includes four symmetrically-positioned holes 314 so that it can be interlocked with the spring block in either of two positions. Electrical connector 30 may now be inserted into jack frame 20 which includes latch 26 that cooperates with shoulder 316, molded into the top of cover 310, to interlock the two together. Note that jack frame 20 shows numbers 1 and 8 on its front face that establish a numbering convention for the positioning of terminals within the jack frame in accordance with option B of the ANSI/EIA/TIA-568 standard. Wiring labels 340 also includes number 1–8 that identify which slot 313 is interconnected to each specific terminal. Such labeling is particularly useful in the present invention where crossovers made by the conductors of lead frames 320-1, 320-2 change the relative ordering of wires from the ordering that would result if all the conductors were confined to the same plane.

Figure 6:
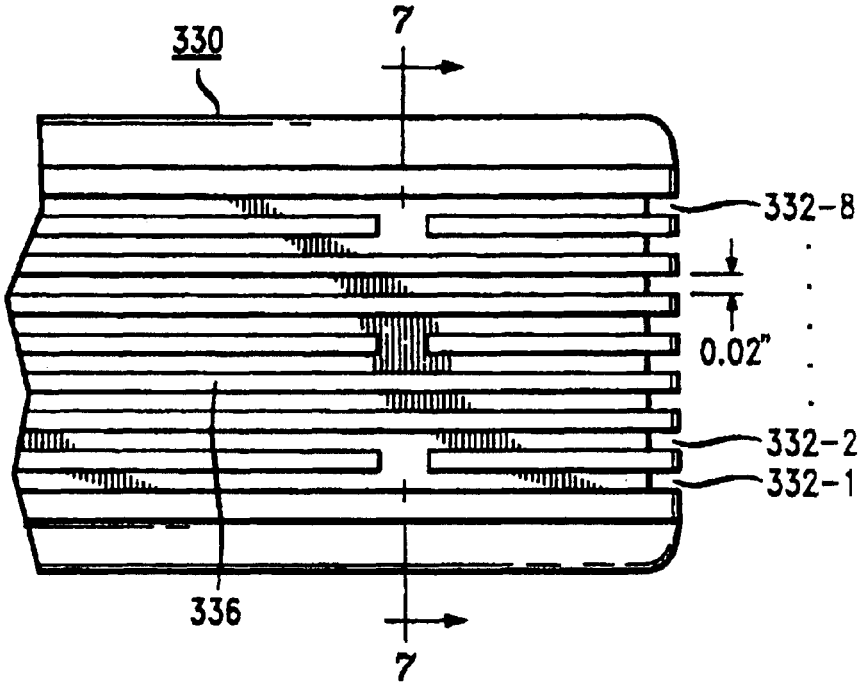
FIG. 6 shows a top view of a portion of the spring block used in the present invention illustrating the region where crossover of the lead frames takes place.
Figure 7:
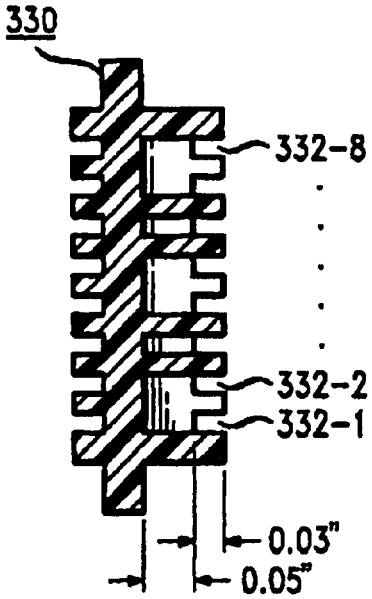
FIG. 7 discloses a partial cross sectional view of the spring block of FIG. 6 in the region where crossover of the lead frames takes place.

Referring now to FIG. 6 there is provided a more detailed view of the top surface 336 of spring block 330 in the region that is inserted into the jack frame. In particular, the pattern of grooves in the top surface are shown in detail to demonstrate the manner in which crossover between conductor paths is accomplished. Grooves 332-1 . . . 332-8, molded in the top surface 336, are approximately 0.03 inches deep and 0.02 inches wide to accommodate a lead frame which includes conductors whose cross-section is generally square (0.015×0.015 inches( that are inserted therein. Dielectric walls separate the grooves to provide electrical isolation for the conductors of the lead frame. However, certain of the dielectric walls, for example the wall between grooves 332-1 and 332-2, are discontinuous in the region were crossover occurs. Furthermore, the grooves are, illustratively, 0.05 inches deeper in this region. This is shown in the FIG. 7 cross-sectional view of the spring block. The purpose of the deeper groove is to accommodate the reentrant bend in the lead frame where crossover occurs. By thus crossing over the conductors of the lead frame, crosstalk between otherwise parallel electrical paths is substantially reduced and the ability to use such telecommunication jacks at higher frequencies is made possible. Indeed, crosstalk reduction in the order of 15 dB is possible at the higher frequencies.

Figure 8:
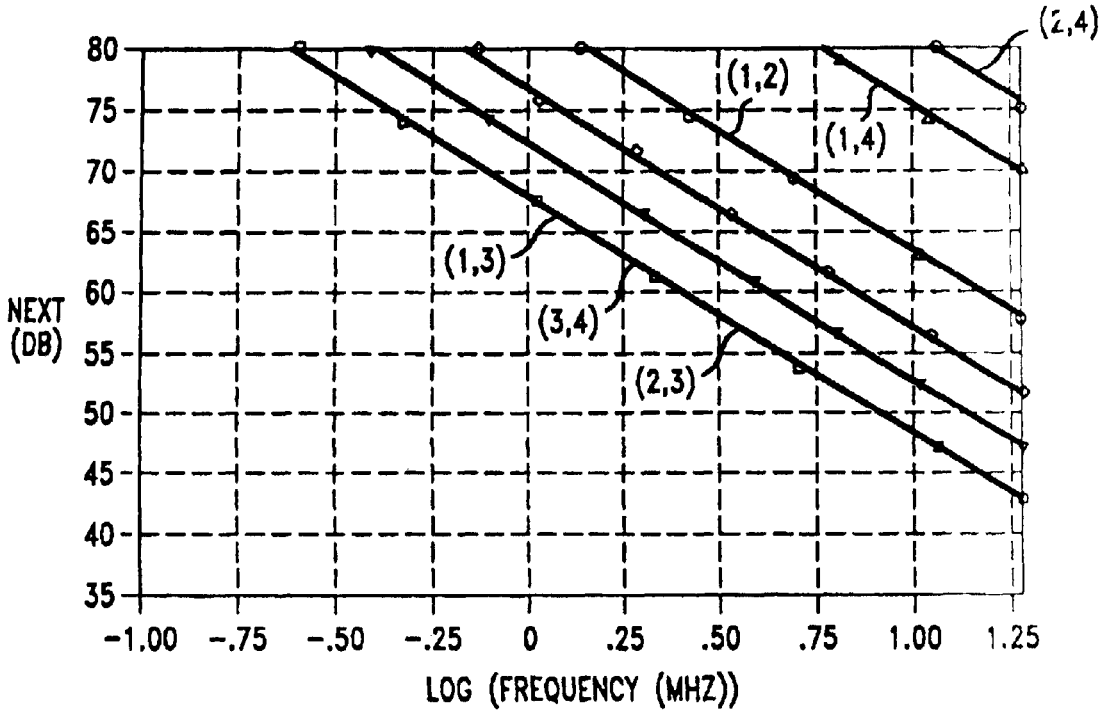
FIG. 8 shows frequency plots of near end crosstalk between different wire-pairs of an electrical connector.
Figure 9:
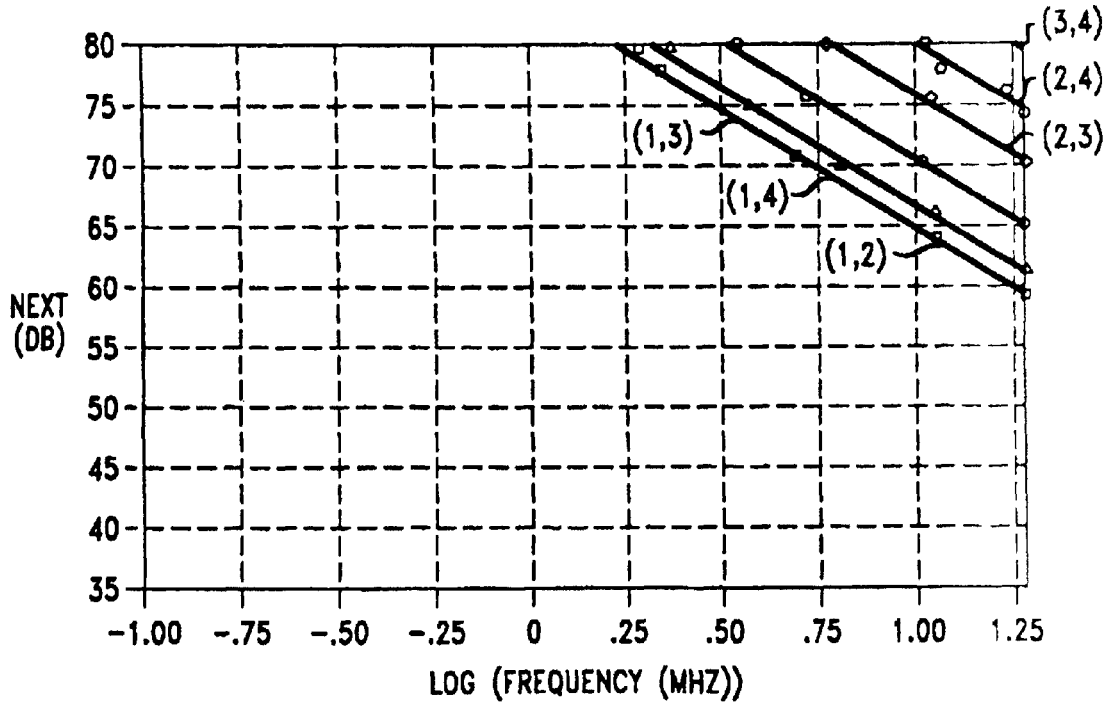
FIG. 9 shows frequency plots of near end crosstalk between different wire-pairs of the same electrical connector used in FIG. 8 after improvement by the teachings of the present invention.

The improvement offered by the present invention is dramatically illustrated in the frequency plots of FIG. 8 and FIG. 9. FIG. 8 shows frequency plots of near end crosstalk (NEXT) between different wire-pairs of the electrical connector shown in FIG. 3 in which lead frames 320-1 and 320-2 are replaced with a single 8-conductor lead frame without crossovers. Frequency is plotted logarithmically in the horizontal direction as an exponent of the base 10. For example 1.00 corresponds to $10^1$=10 MHz. At this frequency, the signal power communicated to wire-pair 3 from wire-pair 1, designated (1,3), is 48 dB below the signal power on wire-pair 1. As might be expected (1,3)=(3,1). The results are the far right-hand side of this frequency plot show crosstalk between the various wire-pairs in the 16 MHz region (i.e., $10^{1.25}$ MHz=17.7 MHz).

FIG. 9 shows frequency plots of NEXT between different wire-pairs of the electrical connector shown in FIG. 8 where three crossovers are used in accordance with the invention. A decrease in the amount of crosstalk between one set of wire-pairs often leads to an increase in the amount of crosstalk between another set of wire-pairs. For example, the crosstalk at 10 MHz between wire-pair (1,3) is 65 dB below the actual signal power which corresponds to an improvement, when compared with FIG. 8, of 17 dB for wire-pairs (1,3); however, crosstalk is increased between wire pairs (1,4) by the present invention. Nevertheless, the net effect is particularly desirable because the worst case crosstalk is so improved to the degree that the subject telecommunications jack is [not] *now* suitable for use in connection with the IEEE 802.5 token ring.

Although a particular embodiment of the invention has been disclosed, various modifications are possible within the spirit and scope of the invention. In particular, it is understood that crossovers between different conductors will result in different amounts of crosstalk between the different wire-pairs. As illustrated, decreasing the amount of crosstalk between specific wire-pairs sometimes results in increasing the amount of crosstalk between other wire pairs. Furthermore, changing the location where crossover takes place influences the amount of crosstalk. These considerations are a matter of design choice. Crossover may be achieved using a double-sided printed wiring board and the use of metal staples or plated-through holes to achieve electrical connection. Finally, the principles of the present invention may be incorporated in numerous connectors including modular plugs and jacks as well as connecting blocks.

We claim:

1. An electrical connector including a plurality of input terminals, a plurality of output terminals, and interconnection apparatus for electrically interconnecting the input and output terminals, the interconnection apparatus comprising at least four non-insulated conductors that are spaced apart from each other and mounted on a dielectric surface, said conductors being generally parallel to each other along a portion of the interconnection path between input and output terminals, the interconnection apparatus further including means for crossing the path of one of the non-insulated conductors over the path of another one of said conductors without making electrical contact therewith; whereby crosstalk of electrical signals between conductors in an electrical connector is reduced.

2. The electrical connector of claim 1 wherein each input terminal of the electrical connector comprises a pair of opposing contact fingers that function to make electrical and mechanical connection to a wire inserted therein.

3. The electrical connector of claim 1 wherein the output terminals of the electrical connector comprise resilient wires.

4. The electrical connector of claim 3 wherein the dielectric [block] *surface* includes a projection which fits into an opening in one side of a jack frame, and wherein the resilient wires wrap around the projection to form spring contacts for engaging an electrical plug inserted into an opening in the opposite side of the jack frame.

5. The electrical connector of claim 1 wherein the interconnection [means] *apparatus* includes first and second lead frames, each containing a plurality of the conductors that individually interconnect one predetermined input terminal with one predetermined output terminal, said lead frames being mounted on top of each other on the dielectric [block] *surface*.

6. The electrical connector of claim 5 wherein the first lead frame includes a conductor that crosses over the path of a conductor on the second lead frame, the conductor on the first lead frame including a reentrant bend at the point of crossover that precludes it from touching the conductor on the second lead frame.

7. The electrical connector of claim 6 wherein all of the conductors on the first lead frame includes reentrant bends along a line that extends from left-to-right across the lead frame.

8. The electrical connector of claim 7 wherein the first and second lead frames are identically constructed but are reverse-mounted on the dielectric [block] *surface* in the left-to-right direction.

9. In combination:

a first metallic lead frame comprising a plurality of flat elongated conductors for communicating electrical signals, each of said conductors terminating at one end in a resilient wire and at the other end in an insulation-displacing connector;

a second metallic lead frame comprising a plurality of flat elongated conductors for communicating electrical signals, each of said conductors terminating at one end in a resilient wire and at the other end in an insulation-displacing connector;

a dielectric block having a top side surface with slots for receiving conductors therein, the first and second metallic lead frames being positioned on the top surface, at least one of the conductors of the first lead frame crossing over a conductor of the second lead frame; and means for precluding the conductors on the first and second lead frames that cross over each other from making electrical connection therewith.

10. In combination:

a plurality of flat elongated conductors for conveying electrical signals along an interconnection path that extends from one end of the conductors to the other end thereof;

a dielectric block including top and front side surfaces, the top surface having slots that are generally parallel to each other and receive the conductors therein; and means for changing the relative positioning of a first and second of the conductors so that along one portion of the path the first conductor is positioned on the right of the second conductor, and along another portion of the path the first conductor is positioned on the left of the second conductor; whereby crosstalk between conductors is reduced.

11. The combination of claim 10 wherein the front surface of the dielectric block includes a tongue-like projection around which the conductors are folded, said projection being shaped for insertion into an opening in a jack frame; whereby an electrical plug having reduced crosstalk is formed.

12. The combination of claim 11 further including a dielectric jack frame having front and back surfaces and an opening that extends therebetween, the opening in the front surface being adapted to receive an electrical plug inserted therein, and the opening in the back surface being adapted to receive the projection of the dielectric block; whereby an electrical jack having reduced crosstalk is formed.

13. An electrical jack comprising a conductor array, a spring block and a jack frame, the conductor array comprising:

a plurality of generally co-planar electrical conductors, each being terminated in a resilient wire at one end and in an insulation-displacing connector at the other end;

a first conductor in the array being positioned on the left side of a second conductor along one portion of a path that extends between their ends, and being positioned on the right side of the second conductor along another portion of the path;

the spring block comprising:

a dielectric structure including a tongue-like projection having top and bottom surfaces, the conductor array being positioned on the top surface of the dielectric structure with its resilient wires folded around the tongue-like projection forming spring contacts; and the jack frame comprising:

a dielectric structure having front and back surfaces and an opening that extends therebetween, the opening in the front surface being adapted to receive an electrical plug inserted therein, and the opening in the back surface receiving the tongue-like projection in the spring block.

14. An electrical plug comprising a conductor array, a spring block and a cover, the conductor array comprising:

a plurality of generally co-planar electrical conductors, each being terminated in a resilient wire at one end and in an insulation-displacing connector at the other end;

a first conductor in the array being positioned on the left side of a second conductor along one portion of a path that extends between their ends, and being positioned on the right side of the second conductor along another portion of the path;

the spring block comprising:

a dielectric structure including a tongue-like projection having top and bottom surfaces, the conductor array being positioned on the top surface of the dielectric structure with its resilient wires folded around the tongue-like projection; and the cover comprising:

a dielectric structure having left-side and right-side walls that are parallel to each other but perpendicular to a top surface that structurally joins the side walls, the cover being joined to the spring block in a manner such that the conductor array is captured between the cover and the spring block.

* * * * *